US008421401B2

(12) United States Patent
Wen (10) Patent No.: US 8,421,401 B2
(45) Date of Patent: Apr. 16, 2013

(54) BATTERY CHARGING DEVICE WITH MULTIPLE POWER SOURCES

(76) Inventor: Chi-Long Wen, Taipei Hsien (TW)

(*) Notice: Subject to any disclaimer, the term of this patent is extended or adjusted under 35 U.S.C. 154(b) by 331 days.

(21) Appl. No.: 12/730,224

(22) Filed: Mar. 23, 2010

(65) Prior Publication Data

US 2011/0234148 A1 Sep. 29, 2011

(51) Int. Cl.
*H01M 10/46* (2006.01)

(52) U.S. Cl.
USPC .......................................................... 320/101

(58) Field of Classification Search ........... 320/137–165
See application file for complete search history.

(56) References Cited

U.S. PATENT DOCUMENTS

| | | | | |
|---|---|---|---|---|
| 3,341,762 A * | 9/1967 | Rockoff | ...................... | 320/126 |
| 4,546,302 A * | 10/1985 | Smith | ......................... | 320/163 |
| 5,583,413 A * | 12/1996 | Proctor et al. | ............... | 320/134 |
| 5,629,601 A * | 5/1997 | Feldstein | ..................... | 320/119 |
| 6,580,251 B2 * | 6/2003 | Takeuchi | ..................... | 320/138 |
| 6,605,926 B2 * | 8/2003 | Crisp et al. | .................. | 320/138 |
| 6,949,913 B2 * | 9/2005 | Nagai et al. | .................. | 320/148 |
| 2005/0253560 A1 * | 11/2005 | Popescu-Stanesti et al. | . | 320/138 |
| 2008/0174277 A1 * | 7/2008 | Ueno | ............................ | 320/138 |
| 2009/0102427 A1 * | 4/2009 | Tamegai et al. | ............... | 320/138 |

OTHER PUBLICATIONS

Horowitz et al., The Art of Electronics, Second Edition, Cambridge University Press, 1989.*
Power over Ethernet, available on Oct. 11, 2009 at http://en.wikipedia.org/wiki/Power_over_Ethernet.*

* cited by examiner

Primary Examiner — Melissa Koval
Assistant Examiner — Daniel Miller (57) ABSTRACT

A battery charging device with multiple power sources comprises a battery device having a battery; a power input adjusting and charging circuit connected to an external power source; a power charging control circuit for detecting voltages of the battery; a power charging device of an Ethernet power supply device having an input connected to a Ethernet power supplying device and having an output connected to a charging circuit; the charging circuit being connected to the battery device; a power charging control device for an Ethernet power supply device for controlling a charging voltage of the charging device to increase to a uniform charging voltage; and an inter-control device having a driver and a switch device; the driver being installed to the power input adjusting and charging circuit, and the switch device being installed to the power charging control device for an Ethernet power supply device.

8 Claims, 9 Drawing Sheets

BATTERY CHARGING DEVICE WITH MULTIPLE POWER SOURCES

FIELD OF THE INVENTION

The present invention relates to a battery charging device with multiple power sources, and in particular to a battery charging device using an Ethernet power supply device and other power source.

BACKGROUND OF THE INVENTION

Using regeneration power (such as solar power) as electric power source is suitable for environmental protection and matches the requirement of power saving. However, many regeneration power systems can not be operated all day long. They are not suitable for the systems operated whole day. Thus it is needed to resolve this problem for the regeneration power systems.

Besides, in IEEE 802.3af, Ethernet data wire or standby wires are used to supply power to Ethernet devices without using adapters.

For the devices based on the IEEE 802.3af, such as IP telephones, wireless feeding points with power level smaller than 12.95 W, a CAT-5is used for power supply. This causes that the wall type transformer is not used and new devices are developed. These devices are integrated with data and power interfaces so that it is compatible with other Ethernet devices of 10, 100 or 1000 Mbps. The use of IEEE 802.3af has caused new applications of Ethernet. The IEEE 802.3af is mainly a power transformation protocol instead of a data transformation protocol.

The power supply of an Ethernet is started from a power supply equipment. Thus how to use prior art power supply for supply power to this device is a new concern in technology.

SUMMARY OF THE INVENTION

The present invention provides a battery charging device with multiple power sources, wherein the regeneration power source is used. The power is save. The releasing of carbon is very small. Two power charging devices are provided. One power charger failure will not affect the overall effect. The inter-control device serves to switch the two power charging devices. No delay occurs. The voltage of the external power source can direct input to the output device directly. The over voltage limiter will cause that when the external power source is over voltage, no voltage is outputted so as to protect the electric devices.

To achieve above object, the present invention provides a battery charging device with multiple power sources. The battery charging device with multiple power sources, comprising: a battery device having a battery; a power input adjusting and charging circuit connected to an external power source for determining the power charging of the battery; a power charging control circuit for detecting voltages of the battery for determining whether power from the power input adjusting and charging circuit is charged to the battery; a power charging device of an Ethernet power supply device having an input connected to an Ethernet power supplying device and having an output connected to a charging circuit; the charging circuit being connected to the battery device; power charging control device for an Ethernet power supply device for controlling a charging voltage of the charging device to increase to a stable charging voltage; and an inter-control device having a driver and a switch device connected to the driver; the driver being installed to the power input adjusting and charging circuit, and the switch device being installed to the power charging control device for supplying power from an Ethernet power supply device; and switching of the switch device causing the power charging control device to charge the battery.

In the battery charging device with multiple power sources, the inter-control device is an optical coupler which has a light emitter and an optical transistor; the light emitting is as the driver and the optical transistor is as the switch device.

In the battery charging device with multiple power sources, the external power source is selected from solar plates, wind generators, water generators, sea water generators, or earth heat generator.

In the battery charging device with multiple power sources, power input adjusting and charging circuit has an input polarity detection circuit having a diode which is connected to the battery.

In the battery charging device with multiple power sources, the power input adjusting and charging circuit has an input voltage detection circuit.

In the battery charging device with multiple power sources, the power input adjusting and charging circuit has an over voltage limiter.

In the battery charging device with multiple power sources, the power charging device of an Ethernet power supply device further includes a uniform charging/floating charging circuit.

In the battery charging device with multiple power sources, the battery device has a battery polarity protection circuit.

In the battery charging device with multiple power sources, the battery device has a battery voltage detection and output control circuit.

In the battery charging device with multiple power sources, a diode is connected between the power charging control device and the battery.

The various objects and advantages of the present invention will be more readily understood from the following detailed description when read in conjunction with the appended drawing.

BRIEF DESCRIPTION OF THE DRAWINGS

FIGS. 2-A, 2-B, 2-C and 2-D are circuits about the battery charging device with multiple power sources of the present invention, wherein theses drawings are assembled to a complete circuit. The connections of the drawings are indicated by "to" and "from" so as to assemble as a complete circuit.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
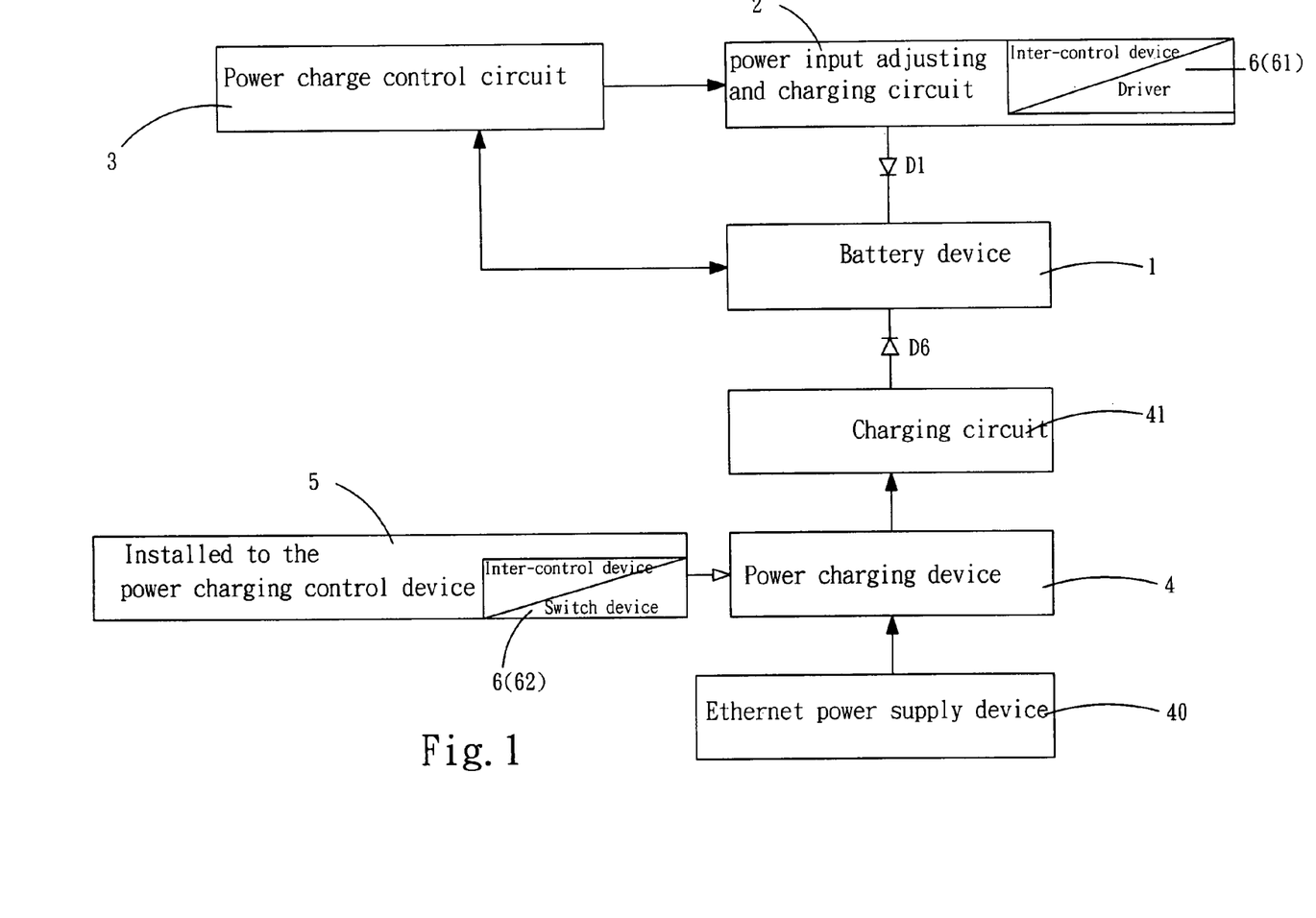
FIG. 1 is a block diagram of the battery charging device with multiple power sources of the present invention.
Figure 2:
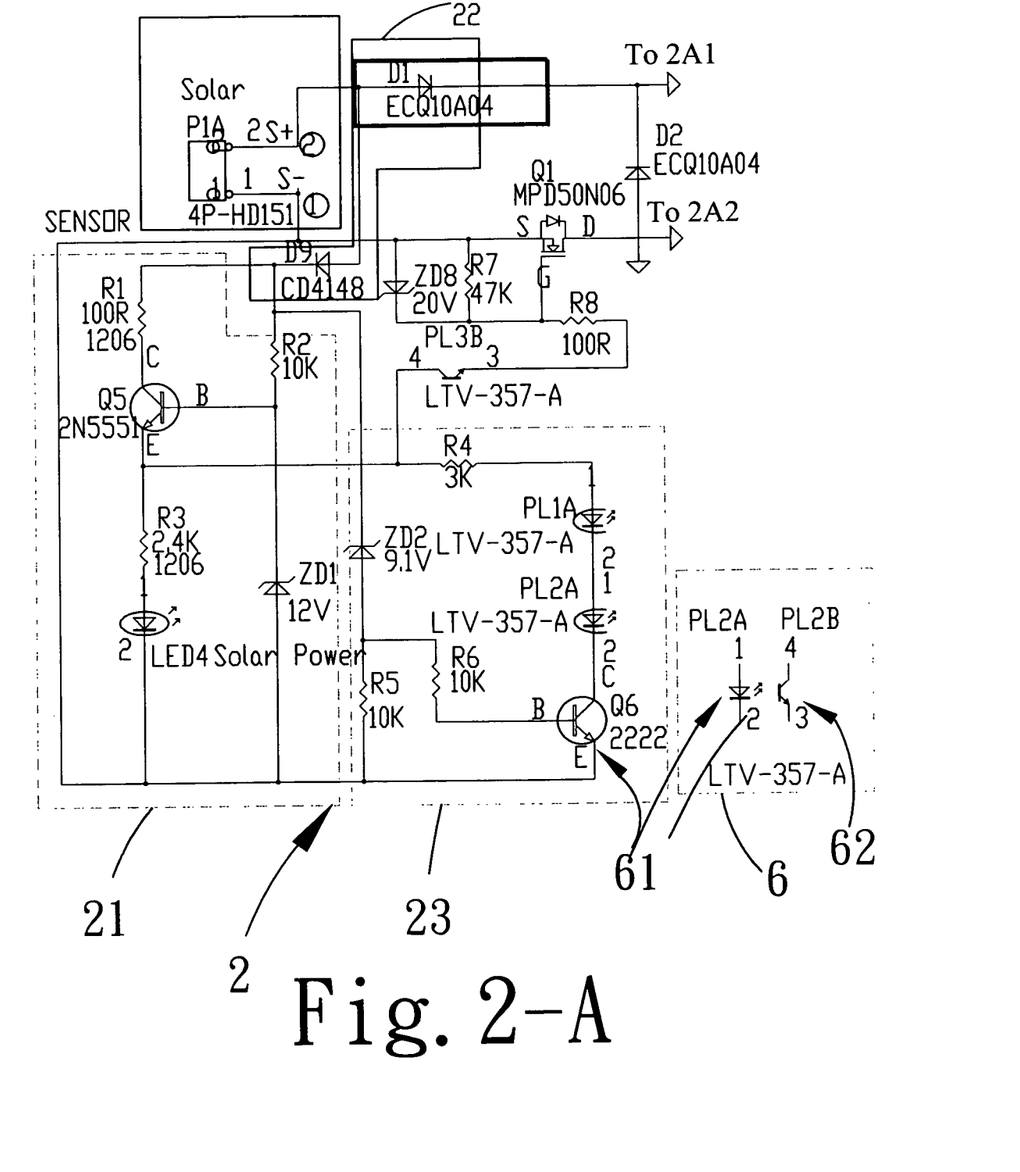

With reference to FIGS. 1 and 2-A to 2-D, the compound power supply of the present invention includes a battery device 1, a power input adjusting and charging circuit 2, a power charging control circuit 3, a power charging device 4 of an Ethernet power supply device, a power charging control device 5 for an Ethernet power supply device and an inter-control device 6.

Referring to FIGS. 2-A to 2-D, the battery device 1 of the present invention includes a battery 11, a battery polarity protection circuit 12, a battery polarity reverse indication 13, a battery voltage detection and output control circuit 14, a battery voltage output indication circuit 15, a base level circuit 16 and an output device 17.

In the present invention, the battery 11 may be a conventional battery, such as a conventional lead-acid battery. In the present invention, the battery polarity protection circuit 12 is formed by a resistor R10, a Zener diode ZD3 and a MOS field effect transistor (MOSFET) Q3. When the battery 11 is reversely connected, the Q3 is cut off so that the battery has no output. In the present invention, the battery voltage detection and output control circuit 14 includes resistors R18, 19 and 20 which formed with a divided voltage to be inputted to a U3B/PIN3. A base voltage is inputted to the U3B/PIN2 through the resistor R22. When the output of the U3B is in a high voltage level, it represents that the voltage of the battery is in a normal state. The resistors R47, R11 and transistor Q4 causes that the voltage of the battery is outputted to the device 17. In the present invention, the battery voltage output indication circuit 15 is formed by a resistor R24 and an LED 2.

Figure 3:
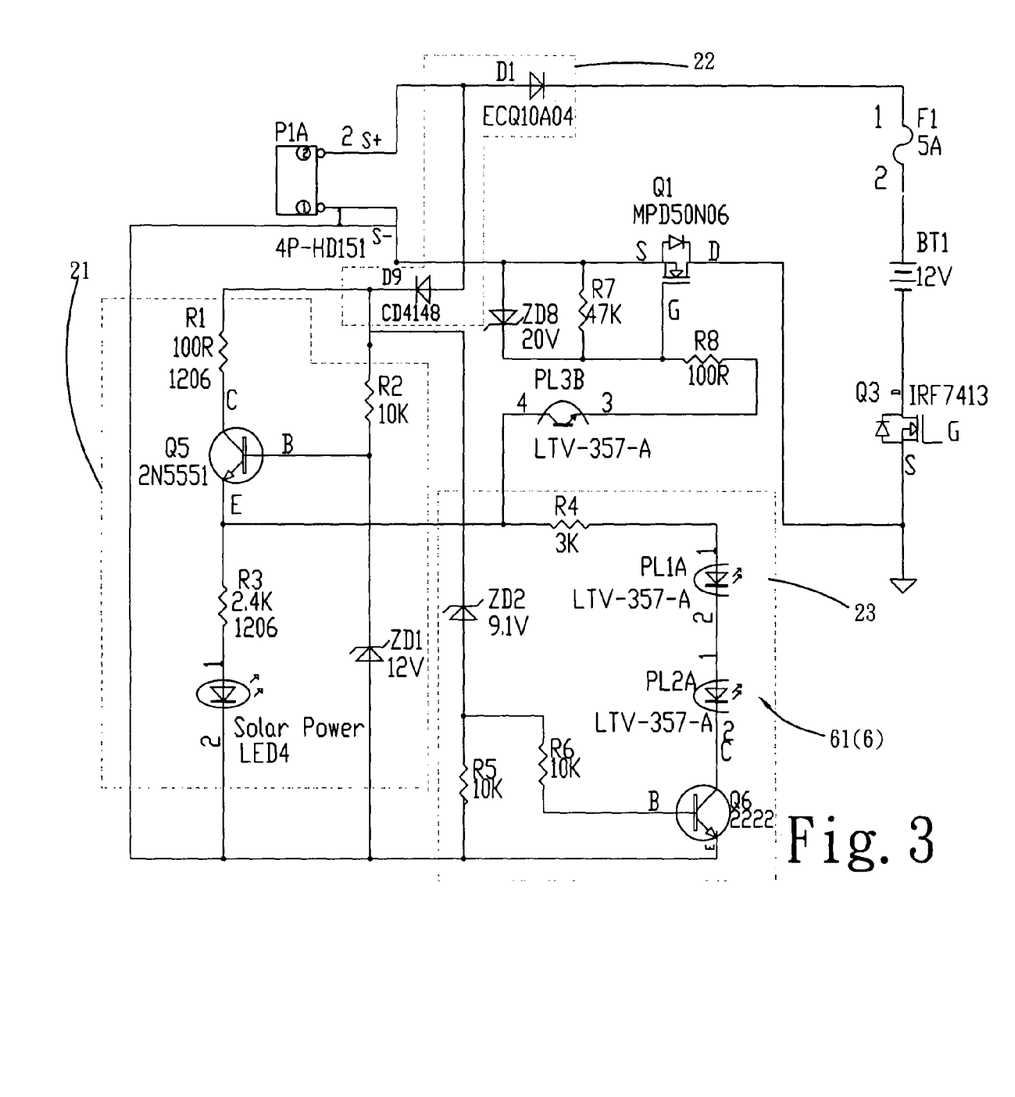
FIG. 3 is a partial circuit diagram about the battery charging device of the present invention.
Figure 4:
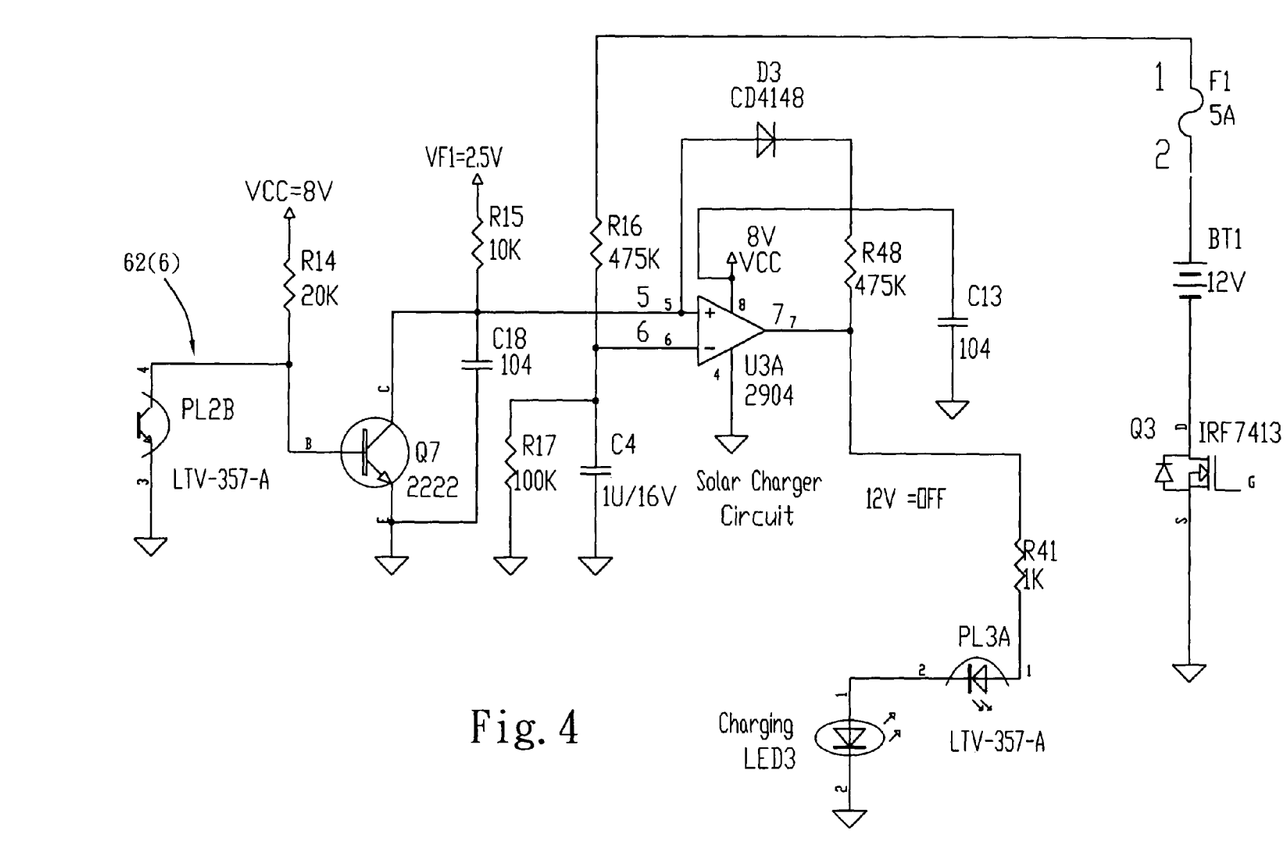
FIG. 4 shows the solar plate charging control circuit of the present invention.
Figure 5:
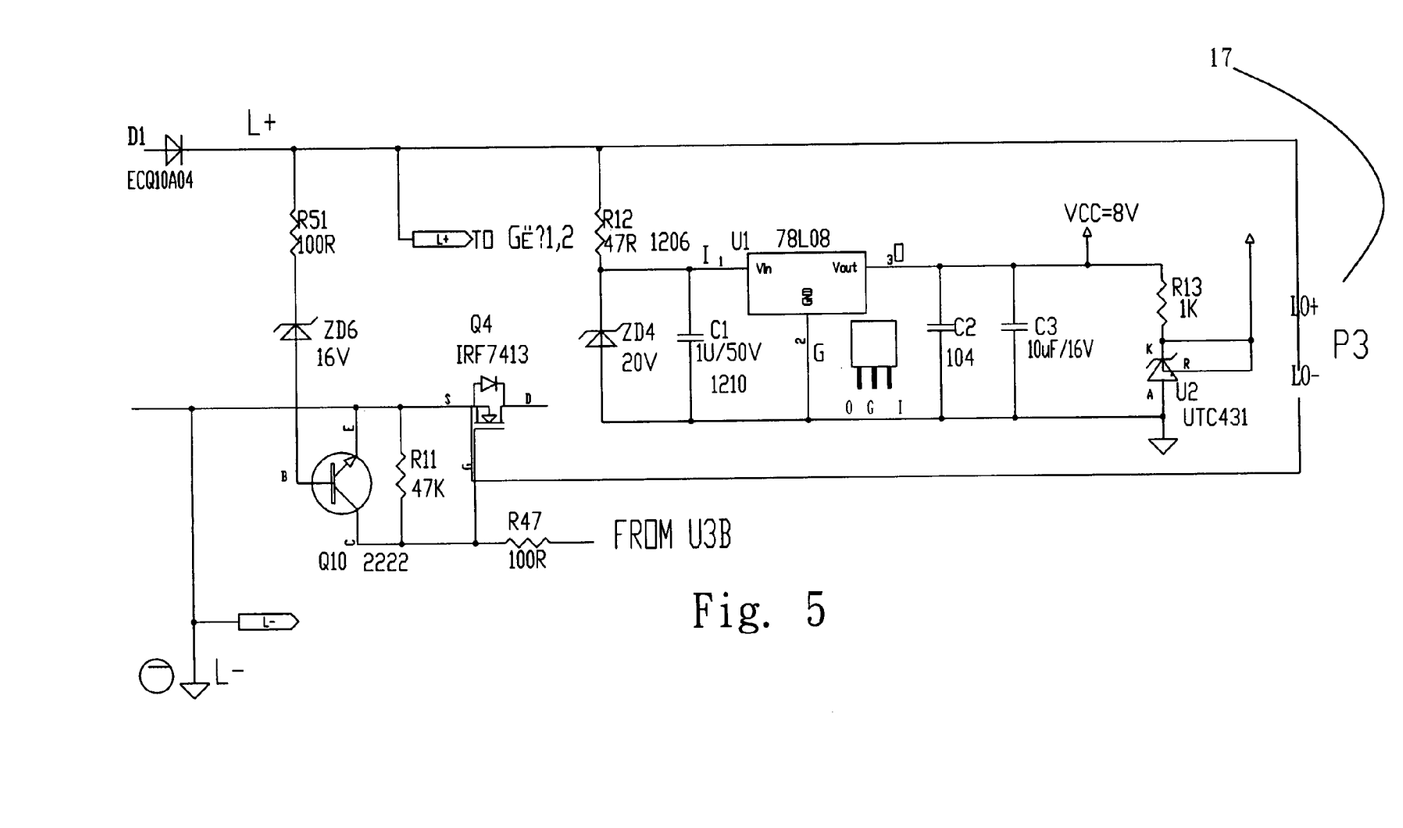
FIG. 5 is a partial circuit diagram showing that the battery charging device having a over voltage limiter.

With reference to FIGS. 3 and 4, the inter-control device 6 of the present invention mainly includes a driver 61 and a switch device 62 controlled by the driver 61. The driver 61 is installed to the power input adjusting and charging circuit 2. The switch device 62 is installed to the power charging control device 5. The switch device 62 serves to actuate the power charging control device 5 so as to drive the power charging device 4 to charge the battery 11.

The inter-control device 6 of the present invention may be an optical coupler, or a relay or other suitable device. In this the present invention, an optical coupler PL2 is used, which includes a light emitter PL2A and an optical transistor PL2B. The light emitter PL2A is as the driver 61 and the optical transistor PL2B is as the switch device 62.

With reference to FIGS. 2-A to 2-D and FIG. 3, in the present invention, the power input adjusting and charging circuit 2 serves to accept an external power source for determination of the power charging of the battery. The external power source may be a regenerated power generation device or system, such as solar plates, wind generators, water generators, sea water generators, or earth heat generator. Herein, solar plates are used for description.

In the present invention, the power input adjusting and charging circuit 2 has a power input indication circuit 21, a power input polarity detection circuit 22, a power input voltage detection circuit 23, a power charging indicator 24 and an over voltage limiter 26.

With reference to FIGS. 2-A to 2-D, in the power input indication circuit 21, when the solar plate has output voltage, the LED4 will indicate the state. The power input polarity detection circuit 22 is formed by diodes D9 and D1. The D1 is connected to the battery 11. The diode D1 charges the battery 11. The power input voltage detection circuit 23 is formed by a Zener diode ZD2, resistors R4, R5 and R6, transistor Q6, optical couplers PL1A and PL2A. If the voltage of the solar plate is lower than a predetermined voltage, such as 12V. Then the charging is stopped. The inter-control circuit 6 formed by the PL2A/2B will intermittedly charge the battery as the charging operation is near to be complete. The charging function from the solar plate will cause the PL1 to be conducted so that the power charging device 4 of an Ethernet power supply device is in a floating-charging state. Thus most charging is from the solar plate. The power charging indicator 24 has an LED3. When the solar plate charges, the LED3 will indicate the state. In this the present invention, when the voltage of the solar plate is larger than that of the Zener diode ZD6, the over voltage limiter 26 will cut off the transistor Q4 so that no voltage is outputted to the output device (P3) 17.

With reference to FIGS. 2-A to 2-D and 4, in the present invention, the power charge control circuit 3 serves to detect the voltage of the battery 11 for determining that the circuit 2 has charged the battery 11. As the external power source is cut off, in the circuit 3 of the present invention, when the solar plate charges, the PL2 will cut off the transistor Q7. Then pin 5 of the U3A serves to compare a base voltage 2.5V with the voltage of the battery in charge (the R16 and R17 will provide a divisional voltage). When the pin 6 is not higher than that of the pin 7 so that the high voltage conduct the R41, PL3 and the LED3. When the voltage of the pin 6 is higher than that of the pin 5, the pin 7 has a lower voltage. Then the transistor Q1 will charge intermittedly.

With reference to FIGS. 1, 2-A to 2-D and 6, in the present invention, an input of the power charging device 4 of an Ethernet power supply device serves to be connected to an Ethernet power supply device 40 and an output thereof has a power charging circuit 41. It is connected to the voltage 11 through the battery device 1. The output circuit formed by the D6 and R46 serves to charge the battery.

Figure 6:
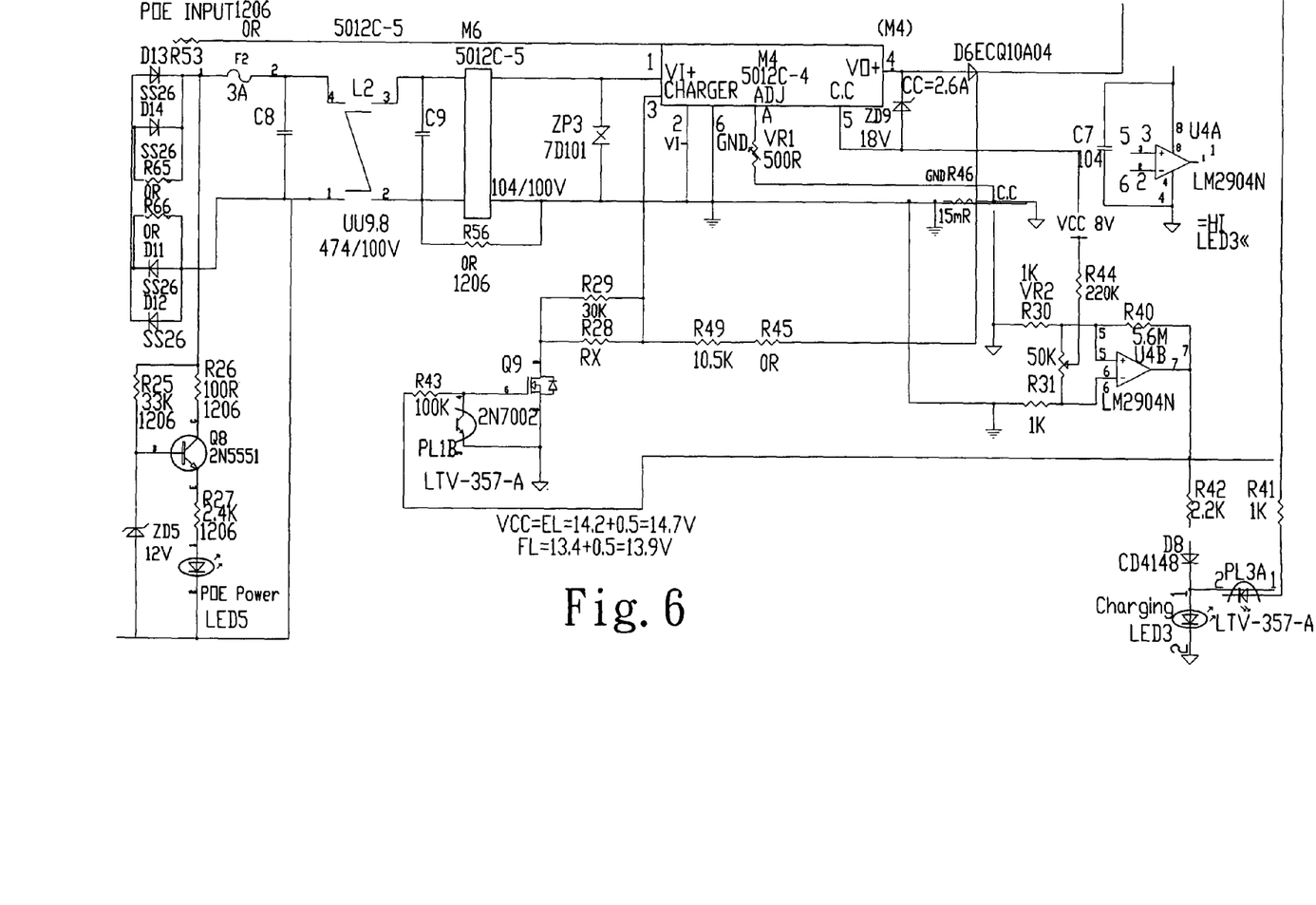
FIG. 6 shows the circuit diagram of the power charging device and power charging control circuit for Ethernet power supply.

Besides, in the present invention, in the power charging control device 5 for an Ethernet power supply device, when the charging voltage of the device 4 has increased to a predetermined voltage, such as 14V, the diode D6 charges the battery. The charging current is controlled by the circuit formed by R46 and VR1. Besides, in the present invention, the device 4 further includes a uniform/floating charging circuit 42. The uniform charging means to charge in a fixed voltage and fixed current. In floating charging, when the battery is charged to be near a full state, the charging current will decrease and thus it is a charging operation under a fixed voltage and a varied current. The U4 circuit sets when the charging current is greater than 1 A, the charging voltage is an uniform charging voltage. When the charging current is smaller than 0.8 A, the charging voltage is set to be as a floating charging state. The output charging voltage will interact with the solar plate. The D1 and D6 serve to prevent the current to flow back.

Besides, by the Ethernet charging indication circuit 43, in uniform charging, the indicator will light up. By the Ethernet power supplying indication circuit 44, when the Ethernet power supply has input, LED will light up.

When the device 4 charges the battery 11, if the voltage of the solar plate is higher than 14V, it will charge to the solar plate and the D1 charge the battery.

In the present invention, two different power sources serve to charge the battery, and a main charge power source is determined. If the external power source can not provide suffice power to the battery. The Ethernet power charging device POE is used. When the external power is restore to charge, the inter-control device will switch to the external power source for power saving.

Advantages of the present invention will be described herein.

1. The regeneration power source is used. The power is save. The releasing of carbon is very small.

2. Two power charging devices are provided. One power charger failure will not affect the overall effect.

3. The inter-control device serves to switch the two power charging devices. No delay occurs.

4. The voltage of the external power source can direct input to the output device directly.

5. The over voltage limiter will cause that when the external power source is over voltage, no voltage is outputted so as to protect the electric devices.

6. The battery polarity protection circuit will prevent the reverse of polarities of the battery. No power system or devices are damaged.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A battery charging device with multiple power sources, comprising:
    a battery device comprising a battery;
    a power input adjusting and charging circuit connected to and receiving input power from an external power source, wherein the power input adjusting and charging circuit is connected to the battery and adjusts a first power transfer to the battery from the external power source responsive to a first control signal;
    a battery polarity protection circuit connected to the battery and comprising a resistor, a Zener diode and a MOS field effect transistor, wherein the MOS field effect transistor prevents power transfer from the battery when the battery is connected with a reverse polarity;
    a battery reverse polarity indicator connected to the battery polarity protection circuit for indicating when the reverse polarity of the battery is present;
    a battery voltage detection and output control circuit connected to the battery for determining when a voltage of the battery is in a normal state;
    a battery voltage output indicator connected to the battery voltage detection and output control circuit for indicating when the normal state of the battery voltage is present;
    a power charging control circuit connected to the battery for detecting a voltage of the battery and for generating the first control signal responsive to the detected voltage;
    a power charging device of an Ethernet power supply device comprising an input directly connected to the Ethernet power supply device and an output connected to a charging circuit, wherein the charging circuit is connected to the battery, and wherein the power charging device and the charging circuit control a second power transfer to the battery responsive to a second control signal;
    a power charging control device connected to the power charging device of the Ethernet power supply device for generating the second control signal and for controlling a charging voltage of the power charging device to increase to a stable charging voltage; and
    an inter-control device having a driver device and a switch device, wherein the switch device is connected to and controlled by the driver device, wherein the power input adjusting and charging circuit comprises the driver device, wherein the power charging control device comprises the switch device, and wherein the driver device controls the switch device to cause the power charging control device to control charging of the battery via the power charging device and the charging circuit when the external power source is insufficient to charge the battery; and
    an output device for outputting power from the battery.

2. The battery charging device with multiple power sources as claimed in claim 1, wherein the inter-control device is an optical coupler which has a light emitter and an optical transistor; the light emitting is as the driver and the optical transistor is as the switch device.

3. The battery charging device with multiple power sources as claimed in claim 1, wherein the external power source is selected from solar plates, wind generators, water generators, sea water generators, or earth heat generator.

4. The battery charging device with multiple power sources as claimed in claim 1, wherein power input adjusting and charging circuit has an input polarity detection circuit having a diode which is connected to the battery.

5. The battery charging device with multiple power sources as claimed in claim 1, wherein the power input adjusting and charging circuit has an input voltage detection circuit.

6. The battery charging device with multiple power sources as claimed in claim 1, wherein the power input adjusting and charging circuit has an over voltage limiter.

7. The battery charging device with multiple power sources as claimed in claim 1, wherein the power charging device of the Ethernet power supply device further includes a charging/floating charging circuit.

8. The battery charging device with multiple power sources as claimed in claim 1, wherein a diode is connected between the power charging control device for an Ethernet power supply device and the battery.

* * * * *